Dec. 27, 1927. Re. 16,830

M. A. LAABS

PROCESS OF PRODUCING MONOCENTRIC FUSED BIFOCAL LENSES

Original Filed Aug. 22. 1924

Inventor

Max A. Laabs

By Harry H. Styll.

Attorney

Reissued Dec. 27, 1927. Re. 16,830

UNITED STATES PATENT OFFICE.

MAX A. LAABS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS OF PRODUCING MONOCENTRIC FUSED BIFOCAL LENSES.

Original No. 1,630,706, dated May 31, 1927, Serial No. 733,566, filed August 22, 1924. Application for reissue filed November 14, 1927. Serial No. 233,289.

The present invention relates to an improved monocentric or monaxial fused multifocal lens and blank, and has particular reference to the process of manufacture thereof.

An important object of the present invention is to provide such a monocentric fused multifocal wherein the line dividing the reading and distance portions of the said lens passes through the optical center of the reading portion, and resides particularly in the process of manufacture of the lens in such a manner that the optical center can be accurately produced.

Another very important object of the invention is to provide an improved process for forming a monocentric fused multifocal lens of this character that will greatly expedite the construction of such lenses, and that will form a neater and more pleasing lens for use as an ophthalmic lens.

Other objects and advantages of the invention will become apparent during the course of the following description.

In the drawings, wherein like numerals are employed to designate like parts throughout the same:

Figure 1:
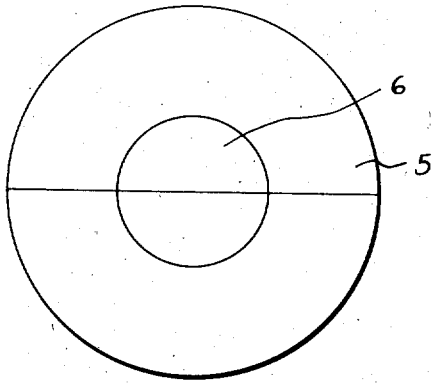
Fig. 1 is a plan view showing the first step in the manufacture of such lenses.
Figure 2:
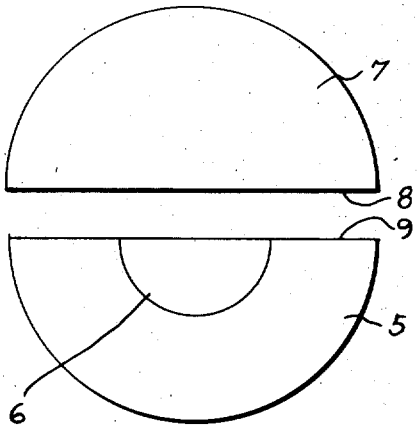
Fig. 2 is a view showing the second step.

Prior to my invention attempts have been made to form such monocentric fused bifocals, but none of the methods used has been entirely satisfactory. In accordance with the present invention I take a major blank 5 and grind a suitable recess or countersink in the geometrical center of the blank 5. After the countersink has been formed I fuse a button 6 therein, as is clearly shown in Fig. 1. After the button 6 has been fused in the countersink, I divide the blank into halves, going through the geometrical center of the blank and button. I preferably form the major blank 5 from crown glass and fuse a button or segment 6 of flint glass therein, although the invention is not necessarily restricted to these two types of glass.

Figure 3:
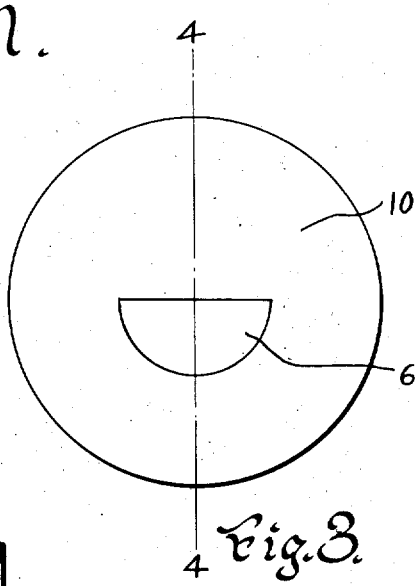
Fig. 3 shows a completed lens.
Figure 4:
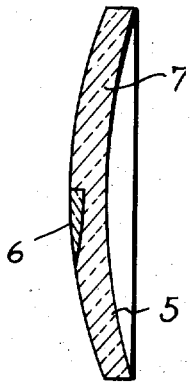
Fig. 4 is a section on line 4—4 in Fig. 3.

After the separation of the blank as above described, I take a semi-circular piece of crown glass 7 of the same refractive index as the part 5, and grind and polish the edge 8 until a smooth, even edge is presented. Likewise, after the separation of the blank, I grind and polish the edge 9 thereof so that the edges 8 and 9 will fit snugly together. The part 7 and the semiblank 5 are then fused at the edges 8 and 9 to present the lens 10 shown in Figs. 3 and 4. Due to the fact that the edges 8 and 9 are ground and polished, there will be no field of aberration between the segment 6 and the portion 7 fused to the blank 5 and segment 6 as shown in Fig. 4. The process employed here will give a monocentric lens having a line of joinder between the segment 6 and portion 7, passing directly through the optical axis of the said segment.

It is to be understood that the relations of the glasses above described do not necessarily have to be followed out, as all three of the sections can be formed from flint glass, or in fact any arrangement of flint and crown can be used as long as 7 and 5 are of the same index of refraction so they will fuse together without visible line of joinder, the invention residing in the fusing of the segment 6 on the geometrical center of the blank 5, separating the blank through the geometrical center, and then fusing a semi-circular disc to the halves.

It is to be understood that the form of the invention herewith shown and described is to be taken as the preferred embodiment of the same, and that various changes in the size, shape and arrangement of parts may be resorted to without departing from the spirit of the invention or the scope of the subjoined claims.

Having thus described my invention, I claim:

1. The process of producing monaxial fused multifocal lenses consisting in fusing a segment of one index of refraction to a major blank of different index, separating the major blank and segment through the geometrical center of the segment, and then fusing a piece of glass of same index as the major blank to the separated edge.

2. The process of producing monaxial fused multifocal lenses consisting in fusing a flint glass segment in a crown glass major blank, separating the blank and segment through the geometrical center of the segment, and then fusing crown glass of same index of refraction as the first crown glass to the halves of the blank and segment.

3. The process of producing monaxial fused multifocal lenses, consisting in fusing a segment in a major blank, separating the major blank and segment through the geometrical center of the segment, then grinding and polishing the separated edge and fusing a piece of glass to the said edge.

4. The process of producing monaxial fused multifocal lenses consisting in forming a recess in a major blank, fusing a segment therein, separating the segment and major portion through the geometrical center of the segment, grinding and polishing the separated edge thereof, then grinding and polishing the edge of another piece of glass, and then fusing the two ground and polished edges together.

5. The process of producing multifocal lenses consisting of fusing a segment of one index of refraction to a major blank of different index of refraction, separating the major blank and segment through the segment and then fusing a piece of the same index of refraction as the major blank to the separated edge.

6. The process of producing multifocal lenses consisting of fusing a segment of one index of refraction to a major blank of different index of refraction, separating the major blank and segment through the segment and then fusing a third piece to the separated edge.

In testimony whereof I have affixed my signature.

MAX A. LAABS.